(12) United States Patent
Lautenschlager et al.

(10) Patent No.: US 6,763,101 B2
(45) Date of Patent: Jul. 13, 2004

(54) SERVICE UNIT USING ESSENTIAL AND NON-ESSENTIAL SERVICE REQUEST MESSAGE CLASSIFICATIONS

(75) Inventors: Wolfgang Lautenschlager, Weissach-Flacht (DE); Uwe Stahl, Leonberg (DE)

(73) Assignee: Alcatel, Paris (FR)

( * ) Notice: Subject to any disclaimer, the term of this patent is extended or adjusted under 35 U.S.C. 154(b) by 550 days.

(21) Appl. No.: 09/845,189

(22) Filed: May 1, 2001

(65) Prior Publication Data
US 2001/0040951 A1 Nov. 15, 2001

(30) Foreign Application Priority Data
May 13, 2000 (DE) .......................................... 100 23 624

(51) Int. Cl.[7] .............................. H04M 3/42; H04M 7/00
(52) U.S. Cl. ............................. 379/207.02; 379/221.08; 379/229; 379/221.06
(58) Field of Search ........................ 379/207.02, 221.08, 379/221.09, 221.1, 221.11, 229, 230, 221.03, 221.04, 221.06, 279; 709/223, 224, 246

(56) References Cited
U.S. PATENT DOCUMENTS

| | | | |
|---|---|---|---|
| 5,345,502 A | | 9/1994 | Rothenhofer .......... 379/221.09 |
| 6,570,977 B1 | * | 5/2003 | Lautenschlager et al. ...................... 379/221.02 |
| 6,574,241 B2 | * | 6/2003 | Vasarainen ................... 370/469 |
| 6,594,355 B1 | * | 7/2003 | Deo et al. .................... 379/219 |
| 6,687,364 B1 | * | 2/2004 | Lehtinen ..................... 379/219 |

* cited by examiner

Primary Examiner—Benny Tieu
(74) Attorney, Agent, or Firm—Sughrue Mion, PLLC

(57) ABSTRACT

The invention concerns a method for controlling the setting-up of a communication connection by a communication network (TELENET), as well as a service unit for implementing the method. During the call set-up a service request message (SR) for requesting an IN service is transmitted to a network server (SCP1 to SCP3) if the communication connection that is to be set up fulfils predetermined trigger conditions. The service request message (SR) transmitted to the network server (SCP1 to SCP3) is classified by a service unit (SSP; LLIN) as essential or non-essential. The operability of the network server is monitored by the service unit (SSP; LLIN). If the service unit (SSP; LLIN) determines that the operability of the network server (SCP1 to SCP3) is impaired, it initiates the further call set-up of the communication connections if it has classified the service request message (SR) as non-essential and initiates the termination of the further call set-up of the communication connections if it has classified the service request message (SR) as essential.

9 Claims, 2 Drawing Sheets

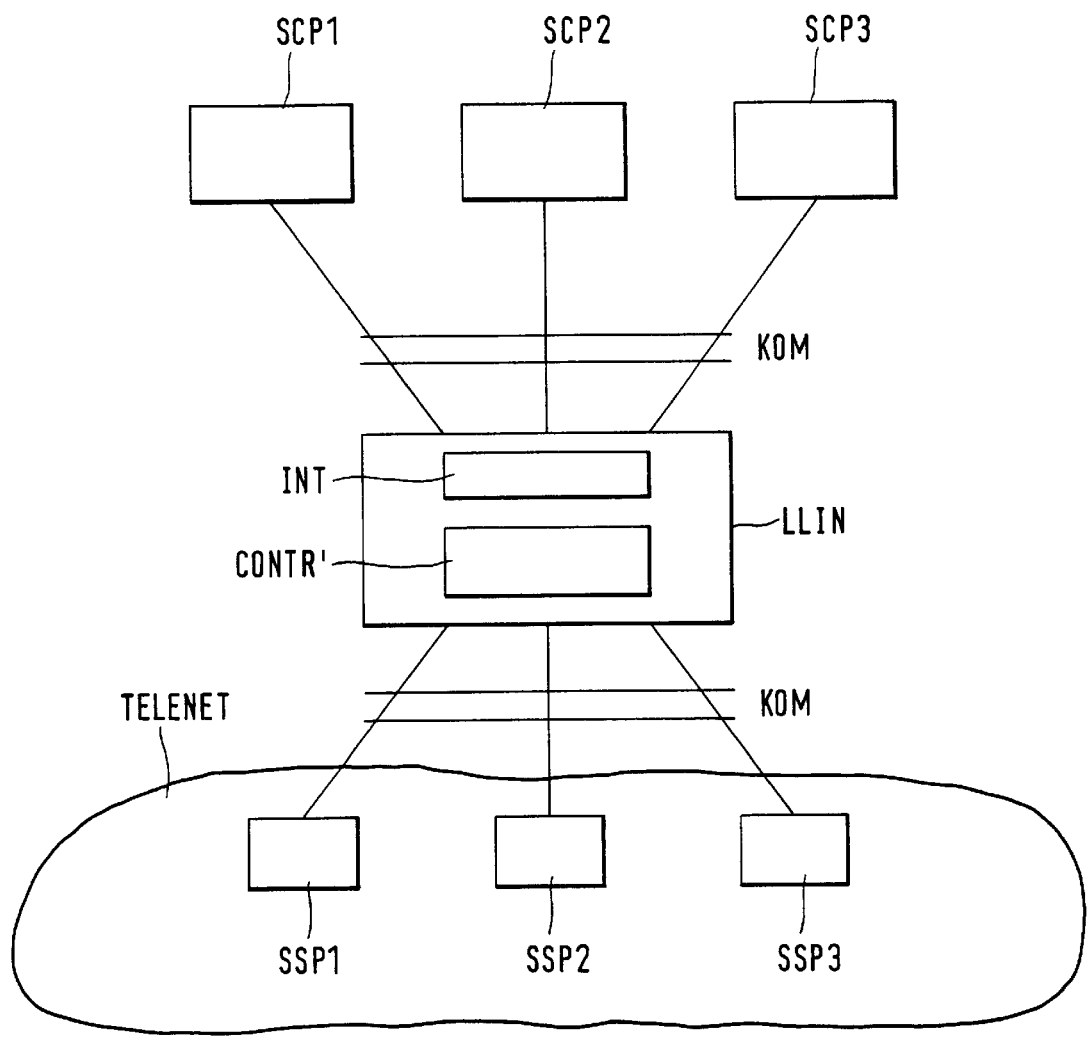

SERVICE UNIT USING ESSENTIAL AND NON-ESSENTIAL SERVICE REQUEST MESSAGE CLASSIFICATIONS

BACKGROUND OF THE INVENTION

The invention concerns a method and a service unit for controlling the setting-up of a communication connection by a communication network, in which during the call set-up a service request message for requesting a service is transmitted to a network server if the communication connection that is to be set up fulfils predetermined trigger conditions.

The invention is based on the provision of services within a telephone network by means of the IN (Intelligent Network) architecture. The provision of a special IN service by a network server is described in U.S. Pat. No. 5,345,502.

Terminals are interconnected via a telephone network that has switching centres, which provide the function of service switching points of an IN architecture. Based on a service identification entered in a call request, these switching centres transmit a service request message to a network server that fulfils the function of a service control point in the IN architecture: if the service switching point detects that the service identification assigned to the IN service is entered in the call request, then it transmits the service request message to the network server. The network server then controls the provision of the IN service. To do this it can initiate the rerouting of the communication connection by the telephone network by transmitting control commands, among other things.

Now the object of the invention is to enhance the availability of services.

SUMMARY OF THE INVENTION

This object is achieved by a method for controlling the setting-up of communication connections by a communication network as well as a service unit for controlling the setting-up of communication connections by a communication network.

Here the invention is based on the idea that service requests directed to a network server are classified as essential or non-essential. If the network server is no longer operative, the further call set-up is enabled for those connections whose assigned service request is classified as non-essential and the call set-up is terminated for those connections whose assigned service request is classified as essential.

The advantage of the invention is that even in the event of failure of network servers, the setting-up of a number of communication connections by the communication network is still possible and at the same time the infrastructure of the communication network is protected against unauthorised access. Furthermore, this makes it possible to implement services in a more cost-effective manner since it enables at least the duplication of some network servers to be avoided.

Advantageous developments of the invention are revealed in the sub-claims.

BRIEF DESCRIPTION OF THE DRAWINGS

The invention is explained below by way of an example with the aid of several exemplary embodiments and with the aid of the attached drawings.

FIG. 2 shows a communications environment with a service unit according to the invention, for a second exemplary embodiment.

DETAILED DESCRIPTION OF THE INVENTION

Figure 1:
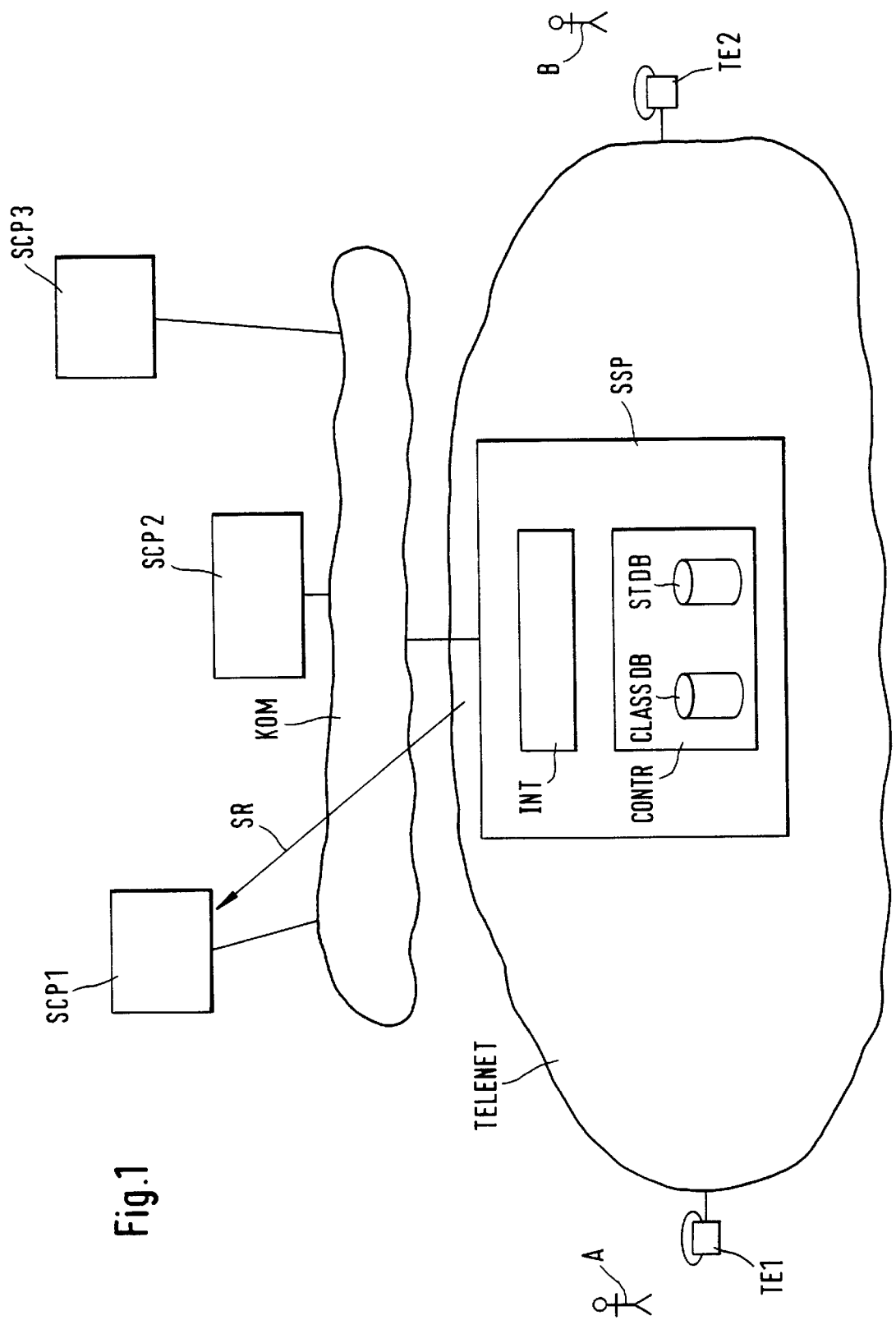
FIG. 1 shows a communications environment with a service unit according to the invention, for a first exemplary embodiment.

FIG. 1 shows a communication network TELENET, several network servers SCP1 to SCP3, two terminals TE1 and TE2 and two subscribers A and B of the communication network TELENET. The terminals TE1 and TE2 are assigned to the subscribers A and B, respectively. The number of terminals and subscribers, as well as their assignment, is chosen by way of an example.

The communication network TELENET is a telephone network. It facilitates communication between the terminals TE1 to TE2. In this case the communication network TELENET is formed by a mobile radio network, for example by a cellular mobile radio network conforming to the GSM (Global System Mobile Communication) standard or a fixed network, for example by an ISDN (Integrated Services Digital Network) or PSTN (Public Switched Telephone Network). It is also possible for the communication network TELENET to include one or more further telephone networks (mobile radio networks or fixed networks) or a data network (for example for voice over IP), which can also be assigned to various network operators.

The communication network TELENET has several specially configured switching centres which fulfill a service switching function in accordance with an IN (Intelligent Network) architecture. Of these switching centres, one service switching point SSP is shown in FIG. 1 by way of example.

The network servers SCP1 to SCP3 provide network services within the communication network TELENET. The number of network servers SCP1 to SCP3 is chosen by way of example.

Each of the network servers SCP1 to SCP3 fulfills the function of a service control point of the IN architecture. In each case they are formed by one or more computers connected via a communications medium on which runs a SW system platform, consisting for example of an operating system and a database system. Application programs which control the provision of services within the communication network TELENET also run on this system platform. These application programs therefore provide the function of service logic units, that is to say they control the sequences of (IN) services.

The service switching points of the communication network TELENET and therefore the service switching point SSP, communicate with the network servers SCP1 to SCP3 via a communication network KOM. The communication network KOM can be part of the signalling network of the communication network TELENET or a data network, for example an IP (Internet Protocol) network, that is to say a data network that uses an IP protocol as level 3 protocol.

The subscriber A initiates the setting-up of a communication connection by the communication network TELENET, for example by pressing a sequence of input keys on the terminal TE1 or by a voice command to the terminal TE1. In order to set up the communication connection requested in this way, the terminal TE1 transmits a corresponding call request message to the communication network TELENET.

If the communication connection that is to be set up fulfils predetermined trigger conditions, then, during the call set-up, a service request message for requesting an IN service is transmitted by one of the service switching points of the communication network TELENET to one of the network servers SCP1 to SCP3. For example, during the call set-up a service request message SR is transmitted by the service switching point SSP to the network server SCP1.

The service request message SR transmitted to the network server SCP1 is classified by a service unit, for example the service switching point SSP, as essential or non-essential. Here a service unit is understood to be a logic or physical unit that provides one or more functions during the provision of services within the communication network TELENET.

The service unit monitors the operability of the network server. The service switching point SSP therefore monitors the operability of the network server SCP1. If the service unit determines that the operability of the network server is impaired, then it initiates the further call set-up of the communication connections if it has classified the service request message as non-essential, and initiates the termination of the further call set-up of the communication connections if it has classified the service request message as essential. Therefore if the service switching point SSP1 determines that the operability of the network server SCP1 is impaired during the processing of the IN service requested by the service request message SR, then it initiates the further setting-up of the communication connection according to the classification of the service request message SR, without the IN service requested by the service request message SR having been provided for the communication connection, or initiates the termination of the call set-up.

It is also possible for the communication network TELENET to be a data network, for example an IP network, and the network servers SCP1 to SCP3 and the service switching point SSP to represent servers of this data network, by means of which services are provided for communication connections that are set up or are to be set up by this data network.

The network servers SCP1 to SCP3 would then form central servers of the data network, which provide services in the data network or control at least a part of the service provision. The service switching point SSP would be a server or a switching point of the data network, which within the data network triggers the provision of a service by the network servers SCP1 to SCP3 for a communication connection. Otherwise, the functions of these servers corresponding to the network servers SCP1 to SCP3 and the service switching point SSP correspond to those of the network servers SCP1 to SCP3 or the service switching SSP shown in FIG. 1, with the stipulation that the communication connection no longer involves a telephone call but a data connection (different routing, different call set-up).

The detailed construction of the service switching points of the communication network TELENET are explained below by way of example with the aid of the construction of the service switching point SSP.

The service switching point SSP is constructed like a conventional switching centre of a telephone network, with the difference that additional functions for the provision of services for telephone calls and for access to the network servers SCP1 to SCP2 are integrated in the controller of the switching centre. The controller of the service switching point SSP is formed by one or more computers linked via a communications medium supporting a SW system platform, consisting for example of an operating system and a database system, and application programs. When running on the system platform, these application programs control the functions of the service switching point SSP.

From a functional point of view, the service switching point SSP has, among other things, a communications unit INT and a control unit CONTR.

The communications unit INT is used to support the communication of the service switching point SSP with at least one network server. The communications unit INT is for example a network card for communication with the network servers SCP1 to SCP3 via the communication network KOM. The protocol stack processed by the communications unit INT consists, for example, of No. 7 protocols that are used as transport protocols, and an INAP protocol (Intelligent Network Application Protocol) stacked upon them. It is also possible to use other transport protocols, for example an ETHERNET protocol or another LAN (Local Area Network) protocol onto which an IP protocol is stacked. INAP protocols specially tailored to mobile radio networks can also be used.

The functions of the control unit CONTR are provided by application programs which run on the system platform of the controller of the service switching point SSP. The control unit CONTR also has two databases, namely a classification database CLASSDB and a status database STDB.

During the call set-up of communications connections the control unit CONTR initiates the transmission of at least one service request message for requesting an IN service to at least one of the network servers SCP1 to SCP3, if the respective communication connection that is to be set up fulfils predetermined trigger conditions. With the service request message the control unit CONTR requests the addressed network server to control or provide a special IN service for the communication connection. A service request message consists, for example, of a special INAP message that is transmitted to one of the network servers SCP1 to SCP3. Trigger conditions are, for example, that the communication connection is addressed to one or more special called directory numbers, or is initiated by one or more special calling directory numbers.

The control unit CONTR therefore provides the function of a service switching function: for the setting-up of a communication connection a call request message is routed through the communication network TELENET. If the control unit CONTR detects that this call request message fulfils specific trigger conditions, then it initiates the transmission of an assigned service request message to one or more of the network servers SCP1 to SCP3 and therefore requests these IN servers to initiate the provision of a special IN service for the communication connection that is to be set up. In this case the service request message consists of a special INAP message. The further call set-up is suspended until the addressed network server initiates the further setting-up of the communication connection, or possibly at another destination address, by transmitting special control commands to the service switching point SSP.

The control unit CONTR then classifies each of the service request messages transmitted to the network servers SCP1 to SCP3 as essential or non-essential.

The service addressed by the service request message represents one possible criterion for this classification. The control unit CONTR therefore classifies the service request messages as essential or non-essential on the basis of the service addressed by it in each case.

To do this the control unit CONTR accesses the classification database CLASSDB in which those services classified as essential or those services classified as non-essential are listed. By accessing the classification database CLASSDB, the control unit CONTR then determines whether a service request message is to be classified as essential or non-essential.

For example, service request messages that are directed to credit card, pre-paid or universal number services are classified as essential and service request messages that are, for example, directed to call charge advice services are classified as non-essential. Generally speaking, call requests to those services without which a further call set-up is not possible or without which the essential functions of the call set-up, for example charging for use of the communication connection, are not possible, are to be classified as essential. Conversely, service requests to those services without which a call set-up, even if limited or less convenient, is not possible, are to be classified as non-essential.

It is also possible that, because of other criteria, the control unit CONTR classifies a service request message as essential or non-essential. For example, the control unit CONTR can classify a service request message as essential or non-essential on the basis of the subscriber initiating the communication connection or the subscriber to which the communication connection is directed. To do this, the control unit advantageously accesses a classification database in which a relationship between these criteria and the two states—essential and non-essential—is stored.

It is particularly advantageous to classify a service request message as essential or non-essential on the basis of the IN service addressed by it and the subscriber or terminal initiating the communication connection. In this case the control unit CONTR would access a classification database in which the service that is to be classified as essential or the service that is to be classified as non-essential for respective subscribers is stored. Here it is further advantageous that—within certain limits—this subscriber profile can be interactively modified by the respective subscribers themselves. Of course it is also possible that the classification database used for this consists of two separate databases, a first one for the assignment of services and a second one for the assignment of subscribers or terminals to the two states essential and non-essential.

For example, in the classification database a service request message that is directed to a call charging service for a communication connection initiated by a hotel extension or a telephone box, can be classified as essential, but can be classified as non-essential for a communication connection initiated by another terminal.

The service control unit CONTR first determines the service to which a service request message is directed, for example from the destination address of this message, and which subscriber or terminal of the communication network TELENET initiated the setting-up of the assigned communication connection, for example from the called directory number entered in the call request message. With this information it then accesses the classification database described above and ascertains from it whether the service request message is to be classified as essential or non-essential.

The control unit CONTR also monitors the operability of the network servers SCP1 to SCP3.

An advantageous option for this is that here the control unit CONTR monitors the response from the network servers SCP1 to SCP3 for the service request messages sent to it. If no message is received from a network server in response to a service request message within a specific time interval, then the operability of the network server is impaired.

A further option for monitoring the network servers SCP1 to SCP3 consists in the regular transmission of supervisory messages by the control unit CONTR to the network servers SCP1 to SCP3, or in the evaluation of error messages which are transmitted by the network servers SCP1 to SCP3 to the service switching point SSP.

In each case the control unit CONTR stores in the status database STDB which service request messages it has classified as essential or as non-essential. In addition to an identification of these service request messages or of the connection which is to be set up and assigned to these service request messages, the status database also stores the information about which of the network servers SCP1 to SCP3 the respective service request message has been sent to. If the service requested by the service request message has been provided, then this service request message and the classification assigned to it is erased from this status database STDB.

If the control unit CONTR determines that the operability of one of the network servers SCP1 to SCP3 is impaired, then it carries out the following functions:

On the one hand it initiates the further call set-up of those communication connections for which a service request message that is classified as non-essential has been sent to this network server and for which the service requested by this service request message has not yet been provided. For this it accesses the status database STDB and determines those service request messages that have been sent to the network server with the impaired operability, and classified as non-essential and have not yet been erased from the status database STDB. It then determines the communication connections assigned to these service request messages and initiates the further call set-up of these communication connections by arranging for the service switching point SSP to forward, among other things, the assigned waiting call request message in modified form.

On the other hand, the control unit CONTR initiates the termination of the further call set-up of those communication connections for which a service request message classified as essential has been sent to this network server and for which the service requested by this service request message has not yet been provided. For this it accesses the status database STDB and determines those service request messages that have been sent to the network server with the impaired operability, and classified as essential and have not yet been erased from the status database STDB. It then determines the communication connections assigned to these service request messages and initiates the termination of these communication connections by the service switching point SSP.

If the control unit CONTR initiates the further call set-up of the communication connections, then it is advantageous if in this case it initiates the transmission of a special indication or announcement to the calling subscriber of the communication connection that is to be set up. This announcement or indication informs the subscriber that the call set-up takes place in limited form or without the requested services. This announcement or indication can also be implemented in relation to the requested service.

The construction of a service unit according to the invention is now explained with the aid of FIG. 2 by way of a further exemplary embodiment.

FIG. 2 shows the communication network TELENET with several service switching points SSP1 to SSP3, the network servers SCP1 to SCP3, the communication network KOM and a service unit LLIN.

The communication networks TELENET and KOM, as well as the network servers SCP1 to SCP2, are constructed like the communication networks TELENET or KOM, respectively, and like the network servers SCP1, SCP2 and SCP3, respectively, as shown in FIG. 1.

The service switching points SSP1 to SSP3 are constructed as conventional service switching points in accordance with the IN architecture and do not have the additional functionalities of the service switching point SSP in FIG. 1.

The service unit LLIN is an IN infrastructure server. The service switching points SSP1 to SSP3 send service request messages to this IN infrastructure server which then itself controls infrastructure-related IN services, for example directory number portability functions, and forwards service request messages that are addressed to other services to the network servers SCP1 and SCP3.

The service unit LLIN contains the communications unit INT and a control unit CONTR'.

The communications unit INT is constructed like the communications unit INT shown in FIG. 1.

The functions of the control unit CONTR' are provided by application programs which run on the system platform of the service unit LLIN. In this case, with the exception of the difference described below, the control unit CONTR' provides the same functions as the control unit CONTR in FIG. 1.

During the call set-up of communication connections, the control unit CONTR' initiates the transmission of at least one service request message for requesting an IN service to at least one of the network servers SCP1 to SCP3, if the respective communication connection that is to be set up fulfils predetermined conditions. For this the control unit CONTR' evaluates the service request messages sent to it by the service switching points SSP1 to SSP2. If the service addressed by the service request message is not an infrastructure service, then it initiates the transmission of this service request message to one of the network servers SCP1 to SCP3. In this case the trigger conditions are therefore the type of service that is to be provided for the communication connection.

What is claimed is:

1. A method for controlling the setting-up of a communication connection by a communication network (TELENET), wherein during the call set-up a service request message (SR) for requesting a service is sent to a network server (SCP1 to SCP3) if the communication connection that is to be set up fulfils predetermined trigger conditions, said method including the steps of:

classifying the service request message (SR) sent to the network server (SCP1 to SCP3) by a service unit (SSP; LLIN) as essential or non-essential, monitoring that the operability of the network server by the service unit (SSP; LLIN), and if the service unit (SSP; LLIN) determines that the operability of the network server (SCP1 to SCP3) is impaired, initiating the further call set-up of the communication connections if it has classified the service request message (SR) as non-essential, and initiating the termination of the further call set-up of the communication connections if it has classified the service request message (SR) as essential.

2. A method according to claim 1, wherein the service unit (SSP; LLIN) classifies the service request message (SR) as essential or non-essential on the basis of the service addressed by the service request message (SR).

3. A method according to claim 1, wherein service unit (SSP; LLIN) classifies the service request message (SR) as essential or non-essential on the basis of the subscriber initiating the communication connection.

4. A method according to claim 1, wherein the service unit (SSP; LLIN) classifies the service request message (SR) as essential or non-essential on the basis of the IN service addressed by the service request message (SR) and the subscriber or terminal initiating the communication connection.

5. A method according to claim 1, wherein for monitoring the network server (SCP1 to SCP3) the service unit (SSP; LLIN) monitors the response of the network server (SCP1 to SCP3) to the service request message (SR).

6. A method according to claim 1, wherein the service unit (SSP; LLIN) initiates the transmission of a special indication or announcement to the calling subscriber of the communication connection that is to be set up, if the service unit initiates the further call set-up of the communication connections.

7. A service unit (SSP; LLIN) for controlling the setting-up of communication connections by a communication network (TELENET), wherein the service unit (SSP; LLIN) is provided with a communications unit (INT) for communication with at least one IN server (SCP1 to SCP3) and is provided with a control unit (CONTR; CONTR') that is configured so that, during the call set-up of communication connections, it initiates the transmission of at least one service request message (SR) for requesting an IN service to at least one network server (SCP1 to SCP3) if the respective communication connection that is to be set up fulfils predetermined trigger conditions, said control unit (CONTR; CONTR') further characterized in that it:

classifies the service request messages (SR) transmitted to the at least one network server (SCP1 to SCP3) as essential or non-essential, monitors the operability of the at least one network server, and if it determines that the operability of one of the network servers (SCP1 to SCP3) is impaired, initiates the further call set-up of those communication connections for which a service request message classified as non-essential has been transmitted to this network server, and the service requested by this service request message has not yet been provided, and initiates the termination of the further call set-up of those communication connections for which a service request message classified as essential has been transmitted to this network server and the service requested by this service request message has not yet been provided.

8. A service unit according to claim 7, wherein the service unit (SSP) is a service switching centre.

9. A service unit according to claim 7, wherein the service unit (LLIN) is an IN infrastructure server.

* * * * *